United States Patent [19]

van Deursen

[11] Patent Number: 4,601,368
[45] Date of Patent: Jul. 22, 1986

[54] INFINITELY VARIABLE RATIO TRANSMISSION

[75] Inventor: Petrus H. van Deursen, Deurne, Netherlands

[73] Assignee: Van Doorne's Transmissie B.V., Tilburg, Netherlands

[21] Appl. No.: 411,571

[22] Filed: Aug. 25, 1982

[30] Foreign Application Priority Data

Aug. 28, 1981 [NL] Netherlands ............ 8104001

[51] Int. Cl.[4] ............ F16D 33/00; F16H 7/02
[52] U.S. Cl. .................... 192/3.3; 192/3.31; 192/3.33; 474/28
[58] Field of Search ............ 192/3.29, 3.3, 3.31, 192/3.33, 3.57, 3.58, 103 F; 74/689; 474/18, 28

[56] References Cited

U.S. PATENT DOCUMENTS

| | | | |
|---|---|---|---|
| 2,351,483 | 6/1944 | Carnagua | 192/3.31 |
| 2,707,887 | 5/1955 | Slack | 192/3.3 |
| 3,058,373 | 10/1962 | Snoy et al. | 192/3.3 |
| 3,126,988 | 3/1964 | Memmer | 192/3.3 |
| 3,810,531 | 5/1974 | Edmunds | 192/3.3 |
| 4,152,947 | 5/1979 | Van Deursen | 474/11 |
| 4,274,520 | 6/1981 | Van der Hardt Aberson | 474/28 |
| 4,400,164 | 8/1983 | Cadee | 474/18 |
| 4,457,410 | 7/1984 | Suga et al. | 192/3.58 |

FOREIGN PATENT DOCUMENTS

| | | |
|---|---|---|
| 0007137 | 1/1980 | European Pat. Off. |
| 2948194 | 6/1980 | Fed. Rep. of Germany. |
| 7807579 | 1/1980 | Netherlands. |
| 2033029A | 5/1980 | United Kingdom. |

Primary Examiner—Rodney H. Bonck
Assistant Examiner—Alan G. Towner
Attorney, Agent, or Firm—Cushman, Darby & Cushman

[57] ABSTRACT

A transmission, in particular for a motor vehicle, includes an infinitely variable V-belt transmission with a primary pulley having a primary shaft and a secondary pulley, each having two conical sheaves, a primary and a secondary hydraulic operating cylinder, respectively, for the axial displacement of at least one of the conical sheaves of each pulley, a hydraulic control valve for the control of the transmission ratio, the valve having a housing and an internal valve spool that can be displaced from an end position in which the valve spool rests against a stop and the valve housing having ports openable for the discharge of fluid from the primary operating cylinder and/or the supply of fluid to the secondary operating cylinder, to a center position where ports are substantially closed, so that virtually no supply of fluid to and discharge of fluid from at least one of the operating cylinders can take place, a hydrodynamic transmission unit having a rotary output member connected to said primary shaft and a rotary input member adapted to be driven by a power source, a lock-up device for locking the input and output members together and a lock-up control device responsive to the position of the valve spool between the end position and the center position.

4 Claims, 3 Drawing Figures

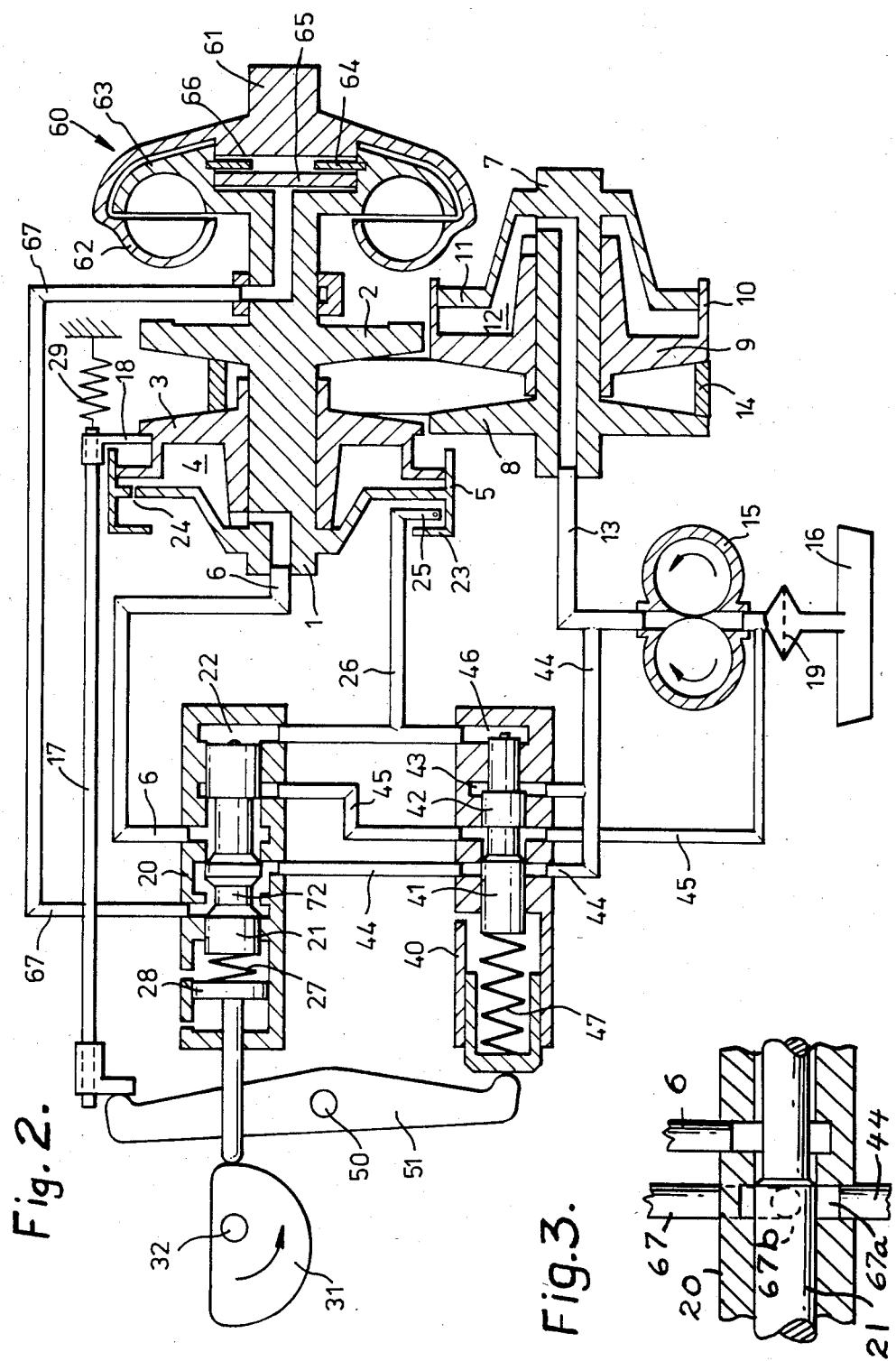

INFINITELY VARIABLE RATIO TRANSMISSION

BACKGROUND OF THE INVENTION

This invention relates to an infinitely variable transmission which is connected at its input end to a hydrodynamic transmission unit such as fluid coupling or a torque convertor.

Infinitely variable transmissions of the kind contemplated by the present invention include an endless belt or chain running over a primary and a secondary V-shaped pulley, each pulley being constructed of two conical discs, one conical disc of the primary pulley being driven by a power source and one conical disc of the secondary pulley driving the transmission output shaft. The other conical disc of each pulley is axially adjustable so that the running diameters of the pulleys can be changed in order to change the ratio of the transmission. Adjustment of the two axial positions of the axially movable discs is effected simultaneously in a manner such that movement of the disc of the second pulley compensates for movement of the primary pulley disc. Control of the axial movement of the adjustable pulley discs is obtained by controlling hydraulic pressure within a hydraulic operating cylinder associated with each pulley, the adjustable disc being integral with or connected to a piston movable within the cylinder. The control device for the cylinders includes a hydraulic spool valve which controls the supply and exhaust of pressure fluid to the cylinders. The valve includes an axially movable spool which is biased in one direction by a fluid pressure which, for example through a Pitot tube, is built up in proportion to the speed of the transmission input shaft, i.e. in proportion to engine speed. The spool is biased in the opposite direction by a compression spring which in turn is biased in proportion to, for example engine intake manifold pressure or the position of the engine throttle.

More specifically the present invention relates to a transmission of the above-summarized kind wherein the valve spool can be displaced from an end position where the valve spool rests against a stop and where ports are opened for the discharge of hydraulic fluid from the primary operating cylinder and/or the supply of liquid to the secondary operating cylinder, to a center position where ports are substantially closed, so that virtually no supply of hydraulic fluid to and discharge of hydraulic fluid from at least one of the operating cylinders can take place.

Such a transmission, which is known from, for instance, U.S. Pat. No. 4,152,947, can be used for driving a motor vehicle. To this end, the transmission may also be provided with a hydrodynamic transmission unit, such as a fluid coupling or a torque converter, connected between the input to the primary pulley and the power source. Such a unit permits the vehicle to drive away smoothly from standstill and also, in the case of a torque converter, to increase the torque produced by the engine when driving away.

A drawback of such a hydrodynamic transmission unit is, however, that it contributes to loss of power in transmission in that the input speed of the hydrodynamic transmission unit generally exceeds the output speed. To reduce this loss of power, the transmission may be provided with lock-up means for bridging the hydrodynamic transmission unit, in which the input and the output shaft of this unit are linked directly to each other by mechanical means. Such a lock-up can be actuated when the hydrodynamic transmission unit is not used for driving away or increasing the torque.

In Netherlands patent application No. 7807579 it has been proposed to make the lock-up operable in dependence on the fluid pressure in the primary operating cylinder. This design results in the lock-up being actuated as soon as the variable V-belt transmissin does not have the maximum transmission ratio, i.e. as soon as the transmission is not in the lowest gear. In consequence, when the vehicle is driving away from standstill the hydrodynamic unit is by-passed (bridged) as soon as the transmission, which initially is in the lowest gear, starts to shift up.

Such a simply operating lock-up does not, however, satisfy for every type of hydrodynamic unit, especially when large differences may occur between the input and the output speed. In that event, a so-called overshoot arises after the vehicle is driving away, that is, for a short moment the engine speed rises above the predeterminated value of the engine speed during shifting-up of the transmission.

SUMMARY OF THE INVENTION

The object of the present invention is to provide a transmission in which the above-indicated unsatisfactory situation is obviated, or at least improved, in a simple fashion. To this end the transmission, which is provided with a hydrodynamic transmission unit and lock-up means for bridging the hydrodynamic transmission unit, is characterized by controls for the operation of the lock-up means depending on the position of the valve body between its end and center positions. In consequence, the lock-up is actuated before the transmission starts to shift up instead of at the moment when the transmission starts shifting up. As the transmission generally starts shifting up when a certain engine speed has been attained, the lock-up will be actuated at a lower engine speed with the transmission according to the invention, whereby the aforesaid overshoot is obviated or at least reduced.

According to a further feature of the invention, the controls may be provided with a sensor for detecting the valve spool in its end position, so that the signal for actuating the lock-up is given at the moment when the valve spool is leaving its end position on the way to the center position, in which position the transmission can shift up. The sensor may include an electric contact.

According to yet another feature of the invention, a fluid duct which can be closed by the valve spool may be provided, the closing and opening of the fluid duct being used for controlling the operation of the lock-up means. The closing and opening of the fluid duct take place during the displacement of the valve spool between the aforesaid positions. Also, according to the invention fluid can be supplied through the fluid duct which can be closed by the valve spool to a hydraulic operating cylinder of the lock-up means so as to ensure simplicity of design.

BRIEF DESCRIPTION OF THE DRAWINGS

Two embodiments of the transmission according to the invention will now be described, by way of example, with reference to the accompanying drawings.

FIGS. 1 and 2 are schematic sectional views of the two embodiments, with corresponding parts denoted by the same reference numerals.

FIG. 3 is a fragmentary sectional view, on an enlarged scale of a part of FIG. 1.

DETAILED DESCRIPTION

Figure 1:
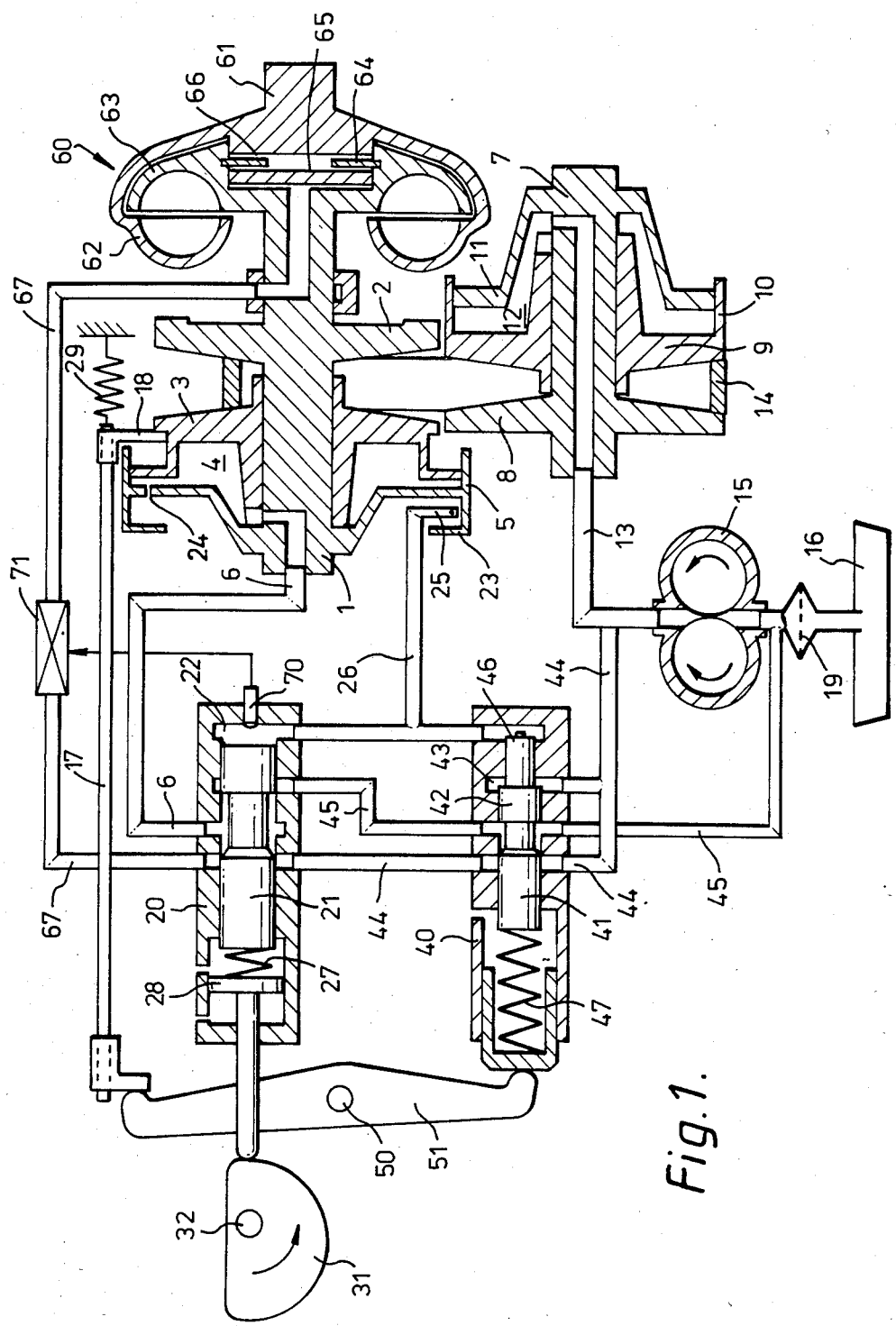

The embodiments represented schematically in the two figures comprise a primary shaft 1, provided with one fixed conical sheave 2 and one axially movable conical sheave 3, which together form the primary pulley. The sheave 3 forms the piston of a hydraulic cylinder 5 enclosing a cylinder space 4 and can be displaced axially by fluid supply and discharge via a line 6. The embodiments also comprise a secondary or output shaft 7, likewise provided with one fixed conical sheave 8 and one axially movable conical sheave 9, which together constitute the secondary pulley. The sheave 9 is integrally united with a cylinder 10, which accommodates a piston 11 rigidly fixed to the secondary shaft 7 so as to enclose a cylinder space 12. Fluid can be supplied to the cylinder space 12 via a line 13.

A V-shaped drive belt 14 is looped over the primary and the secondary pulleys. This may be, for instance, a reinforced or non-reinforced synthetic drive belt or a metal drive belt or chain. Through axial displacement of the conical sheaves 3 and 9, the running diameters of the drive belt 14 about the two pulleys can be changed such that the difference in rotation speed of shafts 1 and 7 can be varied infinitely.

The transmission ratio of the infinitely variable transmission (shaft, pulleys and drive belt) is controlled by means of valve 20, which includes a housing and an internal axially displaceable valve spool or control piston 21. The spool 21 is loaded at one end by the fluid pressure in a space 22, which fluid pressure depends on the speed of rotation of the primary shaft 1. To permit this speed of rotation to be sensed, the cylinder 5 is provided with a radially outwardly closed annular groove 23 which is filled, through an aperture 24, with fluid from the cylinder space 4. If required, filling may also be effected from the outside via a separate fluid supply line. Depending on the speed of rotation of the primary shaft 1, a fluid pressure is built up by means of the pitot tube 25 terminating in the groove 23 and passed on, through a line 26, to the space 22, in which the fluid pressure thus depends on the speed of the primary shaft 1. The spool 21 is loaded at its other end by the biasing force of a compression spring 27, which is compressed through an actuation member 28. To this end, the actuation member 28 can be displaced axially by rotation of a cam 31 about an axis 32.

In the drawings the valve spool 21 is represented in its center position, that is, the fluid line 6 does not communicate with either fluid supply line 44 or fluid discharge line 45, so that no fluid is passed to or from cylinder space 4 and the transmission ratio is therefore constant. Upon displacement of the control piston 21 to the left, fluid will run through lines 44 and 6 to the cylinder space 4, whereby the transmission shifts to a higher gear, that is, the actual working diameter of the belt on the primary pulley 2, 3 increases and that on the secondary pulley 8, 9 correspondingly decreases. By contrast, a displacement of the control piston 21 to the right causes fluid to pass from the cylinder space 4 through the lines 6 and 45, so that the transmission shifts to a lower gear.

In the embodiments represented diagrammatically, the fluid pressure in the cylinder space 12, and hence the compression force in the belt 14, is controlled by means of an overflow valve 40. To this end, valve 40 includes a housing and an internal axially movable piston or spool 41. As the spool 41 has a portion 42 of increased diameter which is in contact with the fluid in a space 43 supplied by a pump 15 from reservoir 16 via a filter 19, the spool 42 will at increasing pumping pressure be displaced to the left (in the figures). Upon sufficient displacement of the spool 41, the fluid in the line 44 may flow back through the line 45 to the low-pressure side of the pump 15.

The spool 42 of the valve 40 is controlled by the fluid pressure in a space 46, which depends on the speed of the primary shaft 1, as has already been described with regard to the fluid pressure in the space 22 of value 20. In addition, the piston 41 is governed by the transmission ratio, which is sensed with the aid of a rod 17 resting with a sensing shoe 18 against the axially displaceable sheave 3, under the influence of a compression spring 29. Depending on the transmission ratio, the rod 17 moves in axial direction, causing the lever 51 to rotate about axis 50, whereby a compression spring 47 in the valve 40 is compressed.

The fluid pressure in the cylinder space 12 is therefore controlled by means of the overflow valve 40 as a function of the transmission ratio (compression force in spring 47) and the speed of the primary shaft 1 (fluid pressure in space 46).

The transmission is furthermore provided with a fluid coupling 60 having a pump wheel 62 connected to an input shaft 61 and a turbine wheel 63 connected to the primary shaft 1. The fluid coupling 60 includes a lock-up device in order to connect the input shaft 61 and the primary shaft 1 mechanically. This lock-up device includes a friction disc 64 connected to the primary shaft 1, which disc can be pressed by means of a piston 65 against a friction surface 66 attached to the input shaft 61. To this end, the piston 65 can be displaced by supplying pressure fluid through a line 67.

Fluid pressure is supplied continously to the line 67. To achieve this there is, in each valve 20 and 40, an annular chamber surrounding the respective spool 21 or 41 at the point of connection of the lines 44 and 67. These chambers allow fluid pressure from the pump 15 to pass through the valve 40 and the lines 44, then through the valve 20 to the line 67 on the high pressure side of the valve 71. In FIG. 3 the annular chamber at the location of the lines 44 and 76 is illustrated at 67a. The line 67 connects with the chamber 67a via a side tube 67b.

When the transmission is mounted in a vehicle, the input shaft 61 is connected to the engine and the output shaft 7 to the wheels of the vehicle by means of the necessary reduction gear. When the vehicle is at a standstill while the engine is running, the primary shaft 1 does not rotate, nor does the secondary shaft 7, whereas the input shaft 61 does rotate. This relative difference in speed between the primary shaft 1 and the input shaft 61 is made possible by the presence of the fluid coupling 60, as long as the lock-up 64, 65, 66 has not been actuated. When the vehicle is at a standstill and hence the primary shaft 1 does not rotate, there is no fluid pressure in the space 22, so that the valve spool 21 is in the extreme right-hand position. The hydraulic fluid can then pass through lines 6 and 45 from the cylinder space 4, so that the belt 14 has a small running diameter in the primary pulley 2, 3. As a result, the variable transmission is in the lowest gear, which is the one desired when driving away from a standstill. (This position of the belt is depicted in the drawings.)

The operation of the transmission installed in a motor vehicle is elucidated by the following.

When driving away from a standstill, the variable transmission is in the lowest gear, as stated above. Also, the valve spool 21 is in the extreme right-hand position, because there is initially no fluid pressure in the space 22. The fluid coupling 60 works in the customary fashion, that is, at increasing speed of the engine and hence of the input shaft 61, the primary shaft 1 is driven with an increasing torque. The vehicle will thereby start moving, that is, the primary shaft 1 starts rotating, whereby the difference in speed between the input shaft 61 and the primary shaft 1 decreases. The rotation of the primary shaft 1 causes a build-up of the fluid pressure in space 22, as described hereinbefore. At a sufficiently high rotation speed of the input shaft 1, the fluid pressure in space 22 is so great that the control piston 21 starts moving to the left, until the center position (shown in the figure) is reached. Upon further displacement of the valve spool 21 to the left, the transmission will shift up to a higher gear, as described hereinbefore.

When the transmission shifts to a higher gear the lock-up 64, 65, 66 can be energized in order to bridge the hydrodynamic unit 60. This energizing of the lock-up 64, 65, 66 does not, however, synchronize with the shift-up of the transmission, but occurs at an earlier instant. To this end, the transmission according to FIG. 1 is provided with an electric contact 70 which, as soon as the valve spool 21 is no longer in the extreme right-hand position, opens a valve 71, whereby fluid can be supplied through line 67 in order to energize the lock-up 64, 65, 66. In consequence, the lock-up 64, 65, 66 closes when the valve spool 21 starts moving to the left and before the center position is reached.

According to the embodiment of FIG. 2, fluid is passed through lines 44 and 67 to the lock-up 64, 65, 66 by way of a recess 72 provided in the valve spool 21. This recess 72 connects lines 44 and 67 together as soon as the control piston 21 is slightly displaced to the left from its extreme right-hand position. It will be clear that in both embodiments of the invention the lock-up 64, 65, 66 is not merely energized when the transmission is in a gear higher than the lowest one, as is the case with the transmission according to the aforesaid Netherlands patent application No. 7807579. In the transmission according to the present invention the lock-up 64, 65, 66 is energized for a somewhat longer period of time.

What is claimed is:

1. A transmission comprising a hydrodynamic transmission unit connected to the input shaft of a variable ratio V-belt transmission unit, the hydrodynamic transmission unit including a hydrodynamically actuated lock-up means operative to lock the hydrodynamic transmission unit in a direct-driver mode, the V-belt transmission having a fluid pressure cylinder which controls the axial position of a conical pulley disc forming part of the V-belt transmission to control the ratio of input to output, a hydraulic control valve for the control of the flow of fluid from a pump to and from said fluid pressure cylinder, the hydraulic control valve comprising a housing having a reciprocable internal valve spool which can be displaced from an end position in which the valve spool rests against a stop to a second position thereby closing ports of fluid lines leading to the fluid pressure cylinder, the hydrodynamically actuated lock-up means being directly connected to the fluid pump by a fluid duct including a second valve means operated by a control means responsive to the position of the valve spool such that only slight movement of the valve spool actuates the lock-up means before any change in the ratio of the transmission takes place.

2. A transmission comprising a variable ratio V-belt transmission unit having an input and output shaft, a hydrodynamic transmission unit connected to the input shaft of the V-belt transmission, the hydrodynamic transmission having a hydrodynamically actuated lock-up means operative to lock the transmission in a direct drive mode, the V-belt transmission having a variable width pulley on the input and output shafts, the pulleys having conical sheaves which are axially displaceable by a fluid pressure cylinder, a first hydraulic control valve for controlling the flow of fluid from a pump through lines to the fluid pressure cylinder, the hydraulic control valve comprising a housing containing a reciprocatable internal valve spool which can be displaced from a first end position where the spool rests against a stop to a second postion where the fluid lines are closed, the hydrodynamically actuated lock-up means being directly connected to the fluid pump by a fluid duct, said duct including a second valve means responsive to the displacement of the spool from the end position such that only slight movement of the valve spool activates the lock-up means before any change in the ratio of the transmission takes place.

3. A transmission according to claim 1 wherein said second valve is an electrically operated valve connected to a contact device within the housing of the hydraulic control valve which contacts the spool when in the end position.

4. A transmission according to claim 2 wherein the second valve means is integral with the spool and housing of the hydraulic control valve and separate from the portion of the hydraulic control valve which governs fluid flow to the pressure cylinder of the pulley disc.

* * * * *